United States Patent [19]

Grey

[11] 4,273,227

[45] Jun. 16, 1981

[54] TORQUE-TRANSMITTING DEVICES

[76] Inventor: John C. Grey, 30 Osterley Ct., Osterley, Middlesex, TW7 4PX, England

[21] Appl. No.: 98,677

[22] Filed: Nov. 29, 1979

[30] Foreign Application Priority Data

Dec. 4, 1978 [GB] United Kingdom ............... 47080/78
Dec. 4, 1978 [GB] United Kingdom ............... 47081/78

[51] Int. Cl.$^3$ ............................................. F16D 43/20
[52] U.S. Cl. ................................... 192/56 R; 192/150
[58] Field of Search ................ 192/56 R, 150; 173/12

[56] References Cited

U.S. PATENT DOCUMENTS

| 3,132,730 | 5/1964 | Dahlstrand | 192/56 R |
| 3,260,334 | 7/1966 | Johnson | 192/56 R |
| 3,468,403 | 9/1969 | Nasvytis | 192/56 R |

Primary Examiner—Allan D. Herrmann
Attorney, Agent, or Firm—Pearne, Gordon, Sessions, McCoy & Granger

[57] ABSTRACT

A rotary torque-transmitting device has co-rotating driving and driven members and at least one pair of co-planar roller elements transmitting a torque load through respective line contacts with said members, at least one of which contacts is obliquely offset to produce a force component acting against a resilient bias for urging the rollers to counter-rotate from their load-transmitting positions to disengage the drive or trigger a load sensor. The line contacts are on portions of the driving and driven members that overlap each other transversely to the plane of said pair of rollers to permit a minimum oblique offset of the contact line and thereby increase sensitivity. The roller elements may be cylindrical rollers with axes parallel to the rotary axis of the device and the line contacts along their length.

14 Claims, 11 Drawing Figures

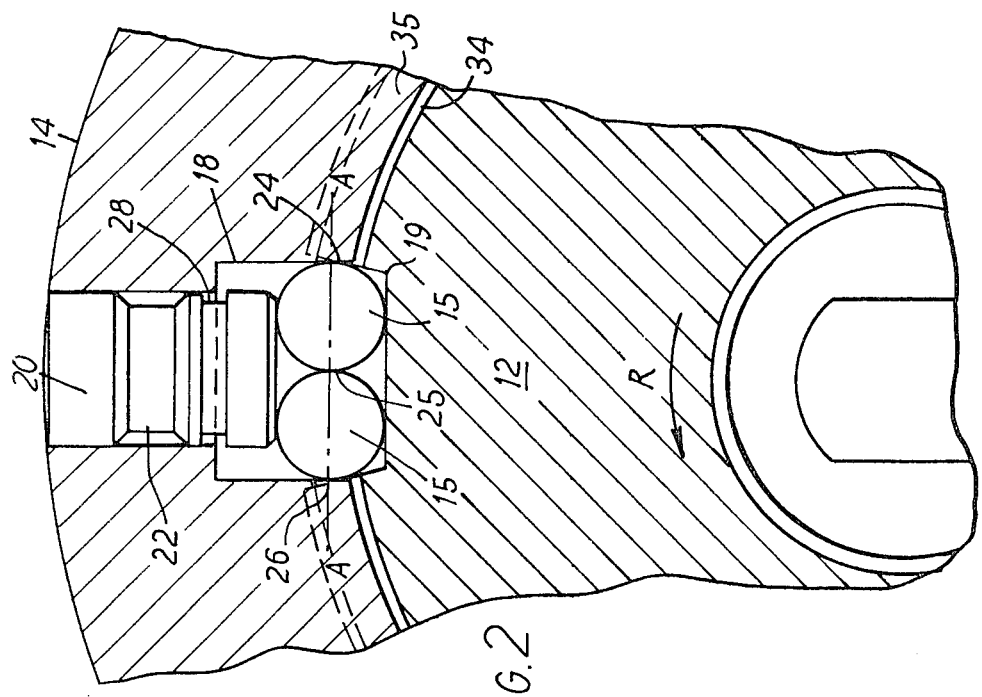
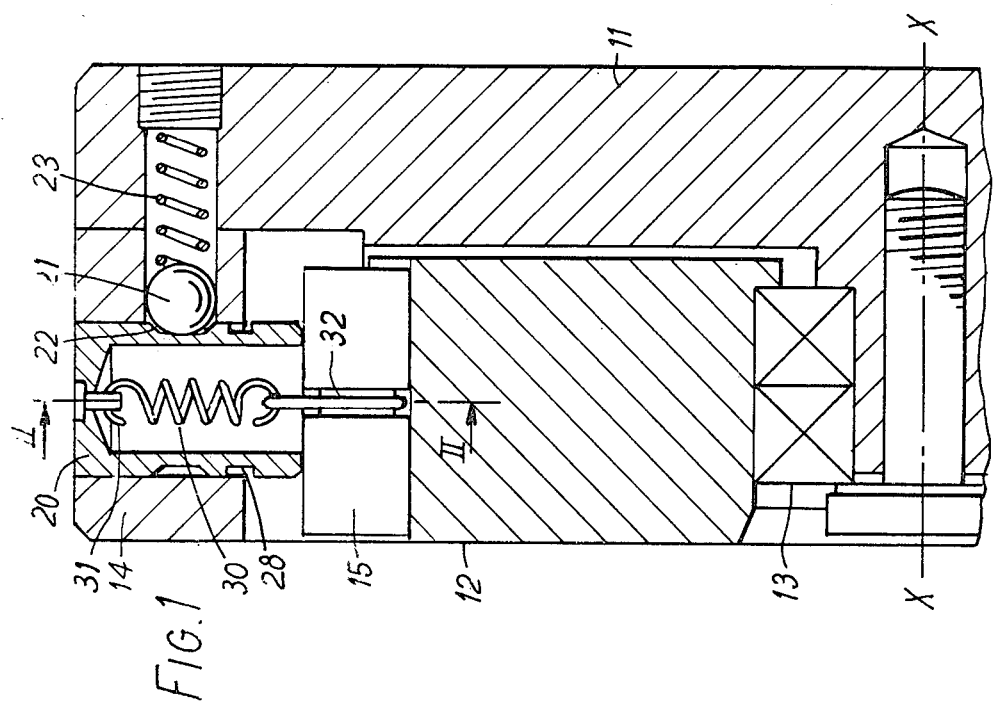

TORQUE-TRANSMITTING DEVICES

BACKGROUND OF THE INVENTION

This invention relates to torque-transmitting devices, such as torque limiting clutches and torque sensors, in which a torque load is transmitted through rolling elements that are arranged in a manner that is sensitive to overload.

In my earlier application Ser. No. 805 782 filed June 13, 1977 I describe such torque-transmitting devices that comprise a series of pairs of rolling elements in the form of rollers or balls to transmit a torque load between rotary input and output members, the elements of each pair being arranged in tandem in recesses in the members with the load being transferred by a contacting face of the input member recess to a rear element of the pair, then to the front element of the pair to a contacting face of the driven member recess, said contacting faces being so arranged that one of the balls is engaged at a point oblique to the line through the rolling axes of the pair of elements in order to produce a force component transverse to the torque load that tends to cause the elements to counter-rotate on each other and on their engagement with the members. In the case of a torque-limiting clutch, the increase of the torque load above a chosen limit will rotate the elements sufficiently for them to retract into one of the recesses to a release position in which they are disengaged from driving engagement between the members. In the case of a torque sensor, the elements may not themselves move to a release position but they are arranged to actuate warning means and/or stop means, for example when they have been displaced by the limiting load.

It is a feature of the known arrangement that the rolling movement of the elements on disengagement avoids sliding friction at those contact regions of the elements to which the driving torque is being transmitted, so that a more reliable operation can be obtained at a predetermined overload torque value.

The loads that can be transmitted through the pairs of elements are, however, limited by the small contact zones to which the loads are applied. This disadvantage is of course particularly marked if the rolling elements are balls and it has been proposed to use rollers as rolling element pairs instead, but the geometry of the arrangement disclosed requires barrel-shape rollers to avoid introducing sliding friction effects that would reduce considerably the advantages to be obtained from the counter-rotative effect referred to so that the gain in load-carrying capacity is not as great as might be hoped.

There is also another limitation on the load-carrying capacity in this known arrangement, whether balls or rollers are used as rolling element pairs to transmit the torque. Because the contact zones of the elements with the driving and driven members are disposed very close to the edges of the recesses of the members in which the rolling elements are located, the local stress concentrations can only be supported to a limited extent and there can be unwanted plastic deformation of the contact zones on the members at relatively small torque loads.

If the contact zones are arranged further from the edges of the recesses, another problem arises. In order to keep the rolling elements in their operative position against the transverse force component, a backing member must be provided and in the disengaging rolling motion, the elements have to slide on this member. The sliding friction force is reduced due to the fact that the bearing force between the rolling elements and the backing member will be less than the torque load, but it increases with the angle of obliquity of the offset engagement point that produces the transverse force component, and the angle of obliquity will of course be increased by any attempt to increase the spacing of the contact zones axially of the device.

SUMMARY OF THE INVENTION

According to the present invention in one of its aspects, there is provided a torque-transmitting device comprising rotary input and output members having a common axis of rotation and drivingly coupled by at least one pair of roller elements disposed side-by-side with their rolling axes in a common plane, the torque load from the input member on the or each pair of elements being transferred from an engagement face of the input member onto the rear element of the pair and thence through the front element of the pair onto an engagement face of the output member and said elements being so disposed that the load transmitted through the elements generates a force component transverse to said common plane to produce counter-rotary moments on the elements urging them to roll in the direction transverse to said plane, resiliently displaceable means being arranged to act against said force to resist said rolling movement, said engagement faces of the respective members being provided on portions of the members that overlap each other in the direction transverse to said common plane of the roller element axes but that are spaced from each other in the direction of the rolling axes.

Such a device can have the rolling axes of the rollers arranged in a plane radial to the rotary axis of the device but it is also possible within the scope of the invention to dispose roller pairs with their rolling axes parallel to the rotary axis of the input and output members.

According to the present invention in another of its aspects there is provided a torque transmission device comprising rotary input and output members having a common axis of rotation, and at least one pair of cylindrical roller elements through which the torque is transmitted between the members, said elements being arranged with their rolling axes parallel to said axis of rotation and at a common radial distance from said axis of rotation, the torque load on the or each pair of elements being transmitted through an axially elongate contact zone between said input member and the periphery of one of the elements to a further axially elongate zone contact between the periphery of the other element of the pair and the output member, one of said axially elongate zones of contact of each pair of elements being offset from an axial plane containing their rolling axes and being disposed on a radial plane from the rolling axis of the associated element that is oblique to said axial plane, whereby the transmission of the torque load generates a force component on said one element transverse to said axial plane to produce counter-rotary moments on the elements urging them to roll in the direction transverse to said plane, resiliently displaceable means being arranged to act on said force component to resist said rolling movement.

BRIEF DESCRIPTION OF THE DRAWINGS

The invention will be described in more detail by way of example with reference to the accompanying drawings, in which:

FIG. 1 is an axial half section of a torque-transmitting device according to the invention in the form of an overload release coupling, FIG. 2 is a radial section on the plane II—II in FIG. 1.

DESCRIPTION OF THE PREFERRED EMBODIMENTS

Figure 3:
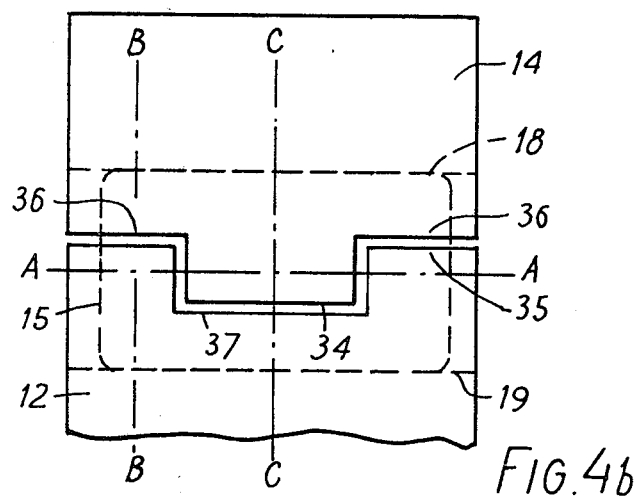
FIG. 3 is a schematic view in a direction similar to that in FIG. 1 illustrating further the arrangement in the coupling of a pair of rollers and their associated engagement recesses, FIG. 4(a) and (b) is a schematic illustration of the engagement recesses, in the driven and driving members respectively, for the pair of rollers seen in the planes B—B and C—C in FIG. 3.

FIG. 1 shows an overload release coupling having a driving or input member 11 that can be attached to an input shaft (not shown) for rotation about an axis X—X. A driven or output member 12 of the coupling is coaxially mounted on the driving member through rolling bearings 13. The driven member is disposed within an outer flange 14 fixed to the driving member and the driving connection between the members is made by a number of similar pairs of cylindrical rollers 15 disposed side-by-side, only one pair being illustrated, at intervals around the periphery of the driven member.

The rollers of each pair have their axes in a common plane A—A normal to the central radial plane of the roller pair from the rotary axis of the coupling, and the rollers are directed parallel to each other and to the rotary axis of the coupling. The rollers are seated within registering recesses 18, 19 in the driving and driven members respectively and are urged to the maximum extent inwards into the recess 19 by a plunger 20 bearing upon them. The plunger is radially slideable in the outer flange 14 but held in place by a detent comprising ball 21 engaging groove 22 in the plunger under the pressure of a biasing spring 23. Assuming anticlockwise rotation of the driving member (arrow R) rear engagement face 24 of the driving member recess transmits a torque load through a zone of contact with the rear roller of the pair and the torque load is transmitted from the rear roller to the front roller at a contact zone 25 of said common plane of the roller axes and thus onto a contact zone on front engagement face 26 of the driven member recess.

The zone of the front face 26 contacting the front roller engages the roller periphery at a region at which the radius from the roller centre is oblique to said common plane A—A and the line between the contact zones through which the torque load is transmitted to and from the roller is therefore offset from the roller axis and produces a transverse force component that tends to rotate the roller anticlockwise and the associated rear roller clockwise. The magnitude of the transverse force increases with the torque load and it is resisted by an opposite force produced by the spring bias acting on the plunger 20. At a given maximum value, previously chosen to correspond to the overload release point of the coupling, the plunger spring bias is overcome as the two rollers rotate in opposite directions on each other, rising out of the driven member recess 19 and so disengaging the coupling.

The plunger is then held in the retracted position by engagement of the ball 21 in a further groove 28 in its periphery. To ensure that the rollers are held in the disengaged position, light springs 30 anchored at their outer ends 31 to the plunger engage central necked portions 32 of the rollers and ensure that the rollers are held against the plungers in their retracted positions.

It is a feature of the disengagement process, as already described, that the counter-rotation of the rollers is largely friction-free, there being sliding only at the contacting regions between the rollers and the plunger, where the bearing force is considerably less than the torque load. It will be understood that while the illustrated arrangement shows a convenient manner in which the transverse force component is generated by the torque load it is possible to obtain a similar effect in different ways, possibly also with further elements interposed between the rollers of the pair so that they are no longer in direct engagement with each other, provided the torque load is transmitted between them so that they can rotate in opposite directions, rolling on the contact zones that transmit the main load, to move out of the engaging recess in one of the members.

From the point of view of the present invention, it is to be noted that in the construction described above the rolling action can be obtained using rollers of a cylindrical form, that are therefore easy to manufacture and that provide an axially extended bearing area without the rolling release action being compromised by any need for the rollers to slip at their bearing engagement zones through which the torque load is being transmitted.

Another significant aspect from the point of view of the present invention, as will now be described lies in the manner in which the torque load is transferred between the driving and driven members of the coupling, in that it requires the driving and driven members to have portions that assume very close radial positions to engage the rollers.

Figure 5:
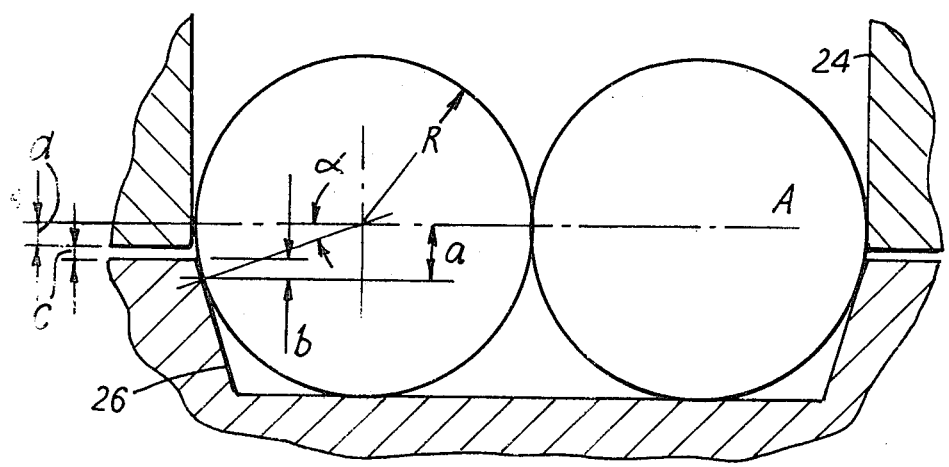
FIG. 5 is a schematic illustration of an alternative arrangement of a roller pair of the coupling in which there is no overlap of the roller engagement regions of the members relative to the plane of the roller axes.

This desirability for the contacting regions to be radially close may be understood better by reference to the schematic illustration in FIG. 5. This shows the rear roller of a pair of rollers of radius R contacted by the rear driving face 24 at the common plane A—A of the roller axes, the rollers contacting each other in the same plane to transmit the torque load to the front roller, and the driven member having an oblique engagement face 26 tangential to its line of contact with the front roller offset from that plane A—A. The contact zone of the front face is shown on a radius of the roller at an angle $\alpha$ to the common plane A—A and spaced a distance a from that plane. The forces on the front roller thus include a component transverse to the plane A—A and, at small values of $\alpha$, directly proportional to the torque load itself.

It has also been mentioned already that the only sliding friction experienced by the rollers in their engagement movement is that of their rotation on the element of the mechanism that is resisting the transverse force component. To minimise the friction, therefore, it is desirable to keep the transverse force (F) as small as possible at the release torque force (T).

For small values of $\alpha$, it is possible to write:

$$F/T = a/R$$

that is to say, the smaller the distance a, the smaller the force F will be.

But there is a practical limit to the reduction of a in the schematic arrangement shown in FIG. 5. There must first be a running clearance (c) between the driving and driven members of the coupling, and the rollers cannot bear on the edges of the recesses if unacceptable deformation is to be prevented under high loads so that the zones of contact on the recesses are at a spacing (b and d respectively) from these edges. As a numerical example, with a roller radius of 9 mm, the reasonable minimum values of b, c and d might be: b=0.75 mm, c=0.5 mm and d=1.0 mm. The total distance a is thus 2.25 mm, whence, $$F/T = a/R = 0.25$$

in other words, it would be impractical to reduce the bearing force on the face on which the rollers slide to less than about one quarter of the torque load they are transmitting.

Figures 4A, 4B:
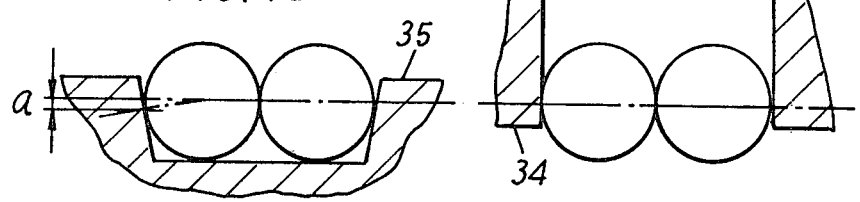

Advantageously, however, it is possible to reduce a further, without encountering the disadvantages already referred to, if the recesses for the roller pair can be arranged in the manner that can be seen most clearly in FIG. 3 and FIG. 4(a) and (b), with the engagement regions of the respective recesses on portions 34, 35 of the driving and driven members that overlap each other radially. This is possible while still allowing the driving and driven members to rotate freely relative to each other when the coupling is disengaged, by separating the engagement regions axially, as is shown in FIG. 3.

Thus, FIG. 3 shows the driving member flange 14 having an inner peripheral face formed with three axially successive regions, namely two outer regions 36 at a radius greater than the radial distance of the roller axes from the centre of the coupling and separated by a central region 34 at a radius less than said rdial distance of the roller axes. These regions in the flange 14 are also interrupted at intervals by the recess 18 for each pair of rollers which extends further outwards radially.

The outer periphery of the driven member 12 has a generally complementary form, leaving only a running clearance with the opposed face of the driving member flange 14. Thus, said outer periphery has two axially outer regions 35 matching the driving member regions 36 at a radius greater than said roller axis radius, and a central region 37 matching the driving member region 34 at a lesser radius than said roller axis radius. The recess 19 for the rollers similarly interrupts these regions, extending further inwards radially. In addition, one of the axially outer regions 35 of the driven member has supplementary recesses (not shown) cut at locations circumferentially spaced from the roller recesses and at least equal to the peripheral length of each portion of the flange central region 34 between successive recesses 18, in order to allow insertion of the projecting central region portions 34 of the driving member flange between the outer regions 35 during assembly.

As can be seen from FIG. 4(a) and (b) with this disposition of the contacting surfaces, the contact zones of the driving and driven members with the rollers can now be disposed some considerable distance from the edge of the associated recesses, each quite independently of the chosen contact zone of the other of the two members. It is therefore possible not only to provide a considerably more robust support to resist an anticipated normal torque load, but also to reduce the offset a without weakening the support for normal loads. The transverse force component for a given torque load can thus be substantially reduced with a corresponding reduction of the friction forces that will be generated in the release movement. This also permits a much lighter construction of the biasing arrangement that holds the rollers in their operative positions and the reduction on the biasing force makes the resetting operation easier after the overload release mechanism has been tripped. Of course, the axially spaced engagement faces of the driven member prevent the generation of twisting or yawning moments in the rollers about a radial axis of the coupling.

It may be mentioned here that the terms "driving" and "driven" member are used mainly for convenience of explanation, in that the functioning of the overload already described would be identical in the example of FIGS. 1 and 2, the member 12 was the driving or input member if the direction of rotation R was reversed. In any event, the symmetrical arrangement of the end faces of each recess shown in FIG. 4(a) and (b) allows the overload release mechanism to be operated in either direction of rotation, whichever member is the driving member, although it will be clear that if desired the forms of the recess can be easily modified to provide an overload trip action in one direction of rotation only.

The invention can also be applied to other configurations of the roller pairs, as will be exemplified in the embodiments now to be described which have the roller axes disposed in a plane radial to the coupling rotary axis instead of in a circumferential plane as in the preceding example. This alternative has the advantage that centrifugal forces will have no influence on the initial biasing force of the release mechanism, but it is not possible then to use simple cylindrical rollers without some sliding friction forces at the zones transmitting the main torque load, because of the changed geometry of the device. It is therefore preferred to modify the roller shape to approach more closely to a pure rolling motion at the region transmitting the main torque load.

Figure 6:
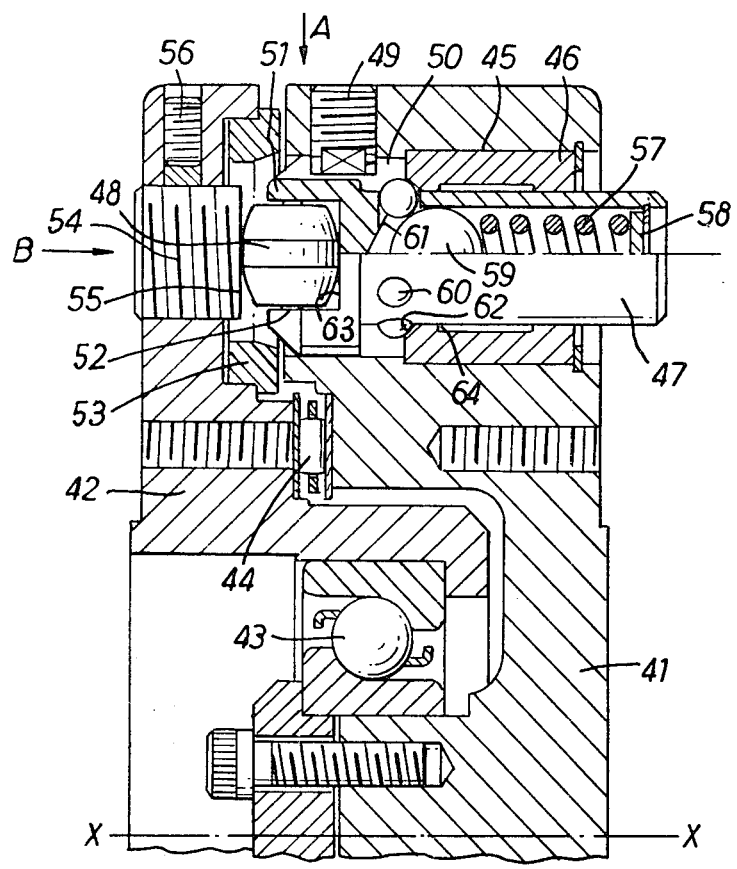
FIG. 6 is an axial half section of a further overload release coupling according to the invention.

FIG. 6 illustrates the alternative arrangement in a coupling in which a driving member 41 of the coupling has the driven member 42 mounted on it for co-rotation about an axis of symmetry X—X through an angular contact ball bearing 43 and an axial thrust roller bearing 44. The driving member has a series of axially directed bores 45 around its periphery in which are fixed respective carrier sleeves 46 each having a tubular housing 47 slidably mounted in it and carrying a pair of torque-transmitting rollers 48. Each housing 47 is prevented from rotating in its sleeves 46 by a locating plug 49 projecting from the driving member periphery into axial slot 50 in the housing so that the rollers are hald with their axes parallel to a radius from the coupling axis X—X through their point of mutual contact. The rollers are connected to opposed flanges 51 of their housings by pins 52 but these act simply as retainers in the initial assembly stage and are a sloppy or "rattling" fit in the rollers, so that they do not restrict in any way the functional movements of the rollers during operation of the coupling.

The roller pairs transmit their torque load to seating rings 53 fixed in the driven member 42. The rollers also bear axially on inserts 54 in the driven member which provide an axial location face 55 to determine the location of the rollers relative to the seating rings in the axial direction of the coupling. As illustrated the inserts 54 are screwthreaded to be axially adjustable and are locked in position by elements 56, but it is also possible for the driven member itself to provide integral fixed axial location faces.

Figure 8:
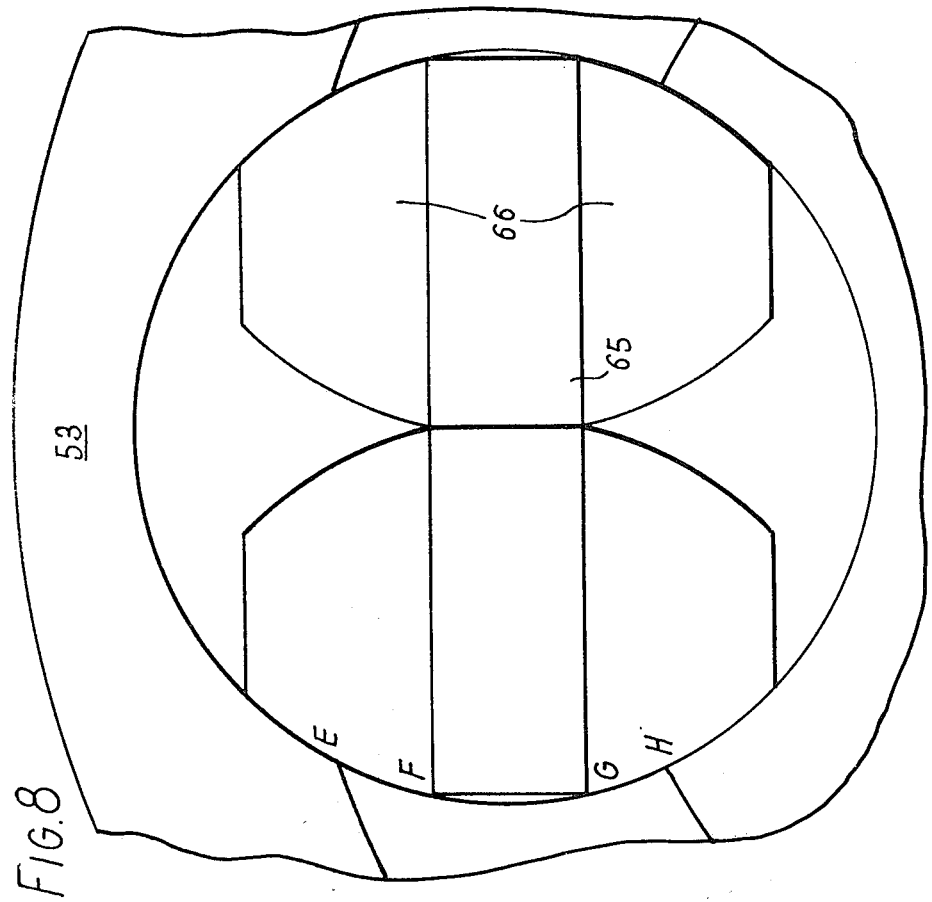
FIGS. 7 and 8 are larger scale schematic illustrations of the rollers and their recesses in this further coupling, FIG. 7 being an axial section and FIG. 8 a view in the direction of the arrow R.
Figure 7:
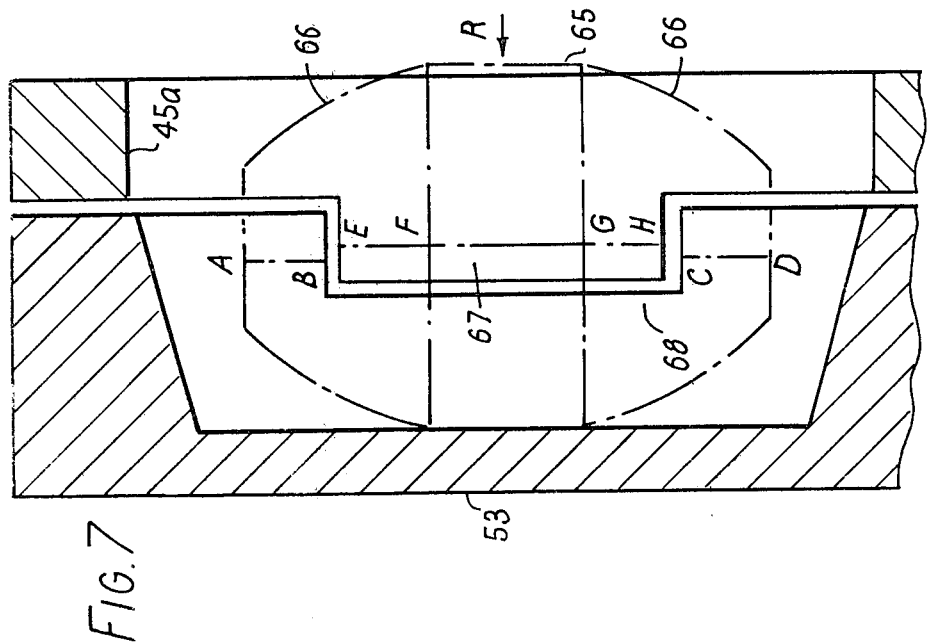

The form of the rollers and their seatings in the coupling members can be seen more clearly in FIGS. 7 and 8. Each roller 48 comprises a central cylindrical portion 65 on each side of which is a spherical zone 66 approximately equal in length to the cylindrical portion and of a radius equal to the radius of the adjoining region 45a of the driving member bore 45 or slightly less to allow for manufacturing errors. Analogously to the preceding example, the driving member engaging face 67 for transferring the torque loads to the rear rollers is on a portion of the member projecting beyond the radial plane containing the roller axes when the rollers are in their operative connecting positions. These portions of the driving member overlap axially the driven member frusto-conical seating rings 53, which are recessed in an annular area 68 concentric with the coupling axis X—X to provide a clearance for said overlapping portions of the driving member.

The driving and driven members contact substantially equal length axial zones of the spherical portions of the rollers. Thus, the lengths AB and CD are equal to the length EF and GH and are also equal to the cylindrical length FG over which the rollers of the pair contact each other so that a substantially equal load distribution is experienced by each of the contact zones of the rollers.

Each roller pair is urged against its respective axial location face by a compression spring 57 in its associated housing which act between end plate 58 of the housing and a thrust ball 59 that urges outwards a series of smaller balls 60 held in pockets 61 in the peripheral wall of the housing the balls 60 thereby engaging an inclined forward face 62 of the sleeve 46 to locate the housing axially and retain the rollers in their operative torque transmission position in an analogous manner to the spring detent of FIG. 1.

The manner of operation of the coupling disengagement mechanism is generally similar to the first example, and it will be clear that, as in that example, the offset of the contact lines AB, CD from the line EH that lies in the plane of the roller axes can be varied as required, and the member engagement faces can project some distance beyond these lines. The rollers are retained in the disengaged position by virtue of their connection with the housing 47 through the coupling pins 52.

Figure 9:
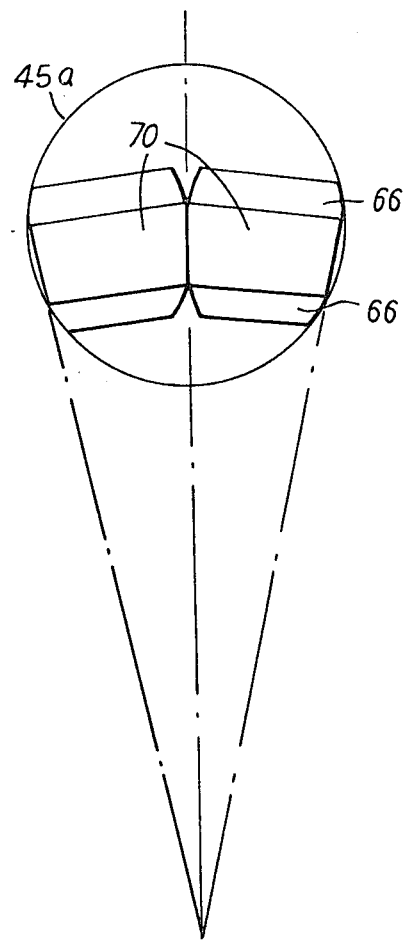
FIG. 9 illustrates another arrangement of rollers for a torque transmitting device according to the invention in a view similar to that of FIG. 8.

The use of cylindrical contact zones between the rollers as shown in this example does not in theory give a pure rolling motion due to the disposition of the roller axes which means that the distance from the coupling axis varies along the axis of a roller. If the ratio of the cylindrical length to its distance from the coupling rotary axis is relatively small, there will be very little sliding movement however, and the frictional effect will be negligible. Nevertheless, if needed a more exact rolling motion can be obtained, as shown in FIG. 9, by replacing the cylindrical surfaces with frusto-conical surfaces 70 having their apices at the coupling rotary axis.

While both the preceding examples have shown the application of the invention to a torque limiting coupling, in which the drive through the coupling is disengaged when the torque load exceeds a predetermined limit, it will be understood that the invention can be also applied to torque sensors, in which the roller pairs are not displaced out of load-transmitting engagement when the limiting load is reached, but their displacement under increasing torque load serves to indicate an abnormal load or actuate means for relieving the load.

Figure 10:
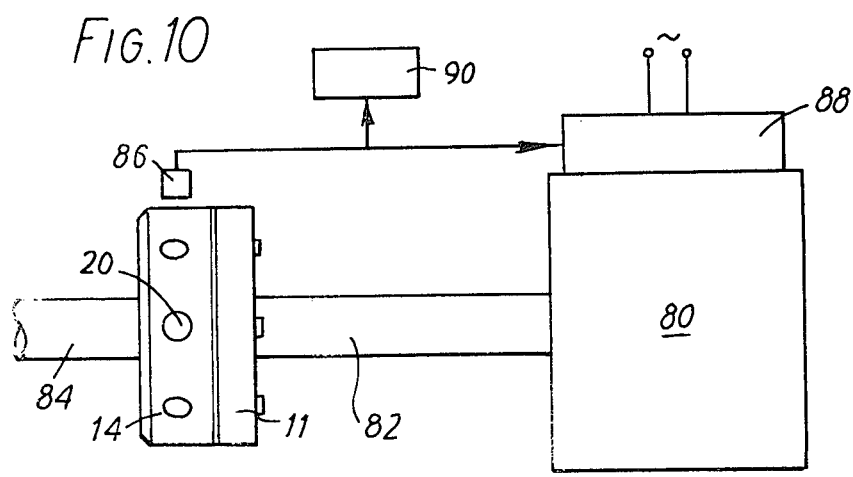
FIG. 10 is a schematic illustration of the application of the invention to a torque sensor.

The arrangement of the construction of FIGS. 1 and 2 in such a torque sensor is illustrated schematically in FIG. 10, in which a motor 80 drives the input member 11 through shaft 82 and the output member 12 is secured to an output shaft 84. In a fixed position adjacent to but radially outwards of the outer periphery of the driven member is a proximity switch 86, connected to a conventional starter and control unit 88 for the motor 80. As the torque load increases, the plungers 20 are displaced outwards in the manner already described but while the drive is still being transmitted they trip the switch 86 (and it can be arranged that their outer movement is so limited that the roller elements remain in load-transmitting engagement at all time). The operation of the switch acts upon the starter and control unit 88 to stop the motor 80, and/or possibly to actuate a warning device 90. The rollers of course return to their radially innermost positions as soon as the drive stops and the load is removed, and the drive can be resumed by simply restarting the motor once the cause of the overload has been removed.

It will be understood that the coupling of FIGS. 7 and 8 can be similarly arranged as a torque sensor, with the switch 86 then being tripped by the axial movement of the housings 47.

As has already been mentioned a coupling according to the invention may have a single pair of rolling elements or a number of pairs. In the latter case the pairs may be equispaced, but in some instances it may be preferred to vary the spacing between adjacent pairs so that engagement will be established between the driving and driven members at only one relative angular position.

What is claimed is:

1. A torque-transmitting device comprising rotary input and output members having a common axis of rotation, at least one pair of cylindrical rolling elements in coupling engagement with the members for transmitting a torque load between the input and output members while co-rotating therewith, said at least one pair of rolling elements having respective rolling axes parallel to the axis of rotation of the members and at a common radial distance from the axis of rotation, said element comprising a front element and a rear element arranged in tandem to each other so that the torque load is transmitted through said elements from the rear element to the front element, a portion of the input member comprising an engagement face having a linear contact zone along the axial length of the rear element of said at least one pair of elements to transmit the torque load thereto and a portion of the output member comprising an engagement face having a linear contact zone along the axial length of the front element of said at least one pair of elements to receive the torque load transmitted therethrough, at least one of said contact zones for said at least one pair of elements being on a radial plane of said one element that is obliquely offset from said common radial distance, whereby the transmission of the torque load generates a force component radially of the axis of rotation of the members to produce counter-rotary movements of the elements urging them to roll in said radial direction, resiliently displaceable means acting on said at least one element for retaining the elements in coupling engagement with the members.

2. A torque-transmitting device comprising rotary input and output members having a common axis of rotation, at least one pair of rolling elements in coupling engagement with the members for transmitting a torque load between the input and output members while co-rotating therewith, said at least one pair of rolling elements having respective rolling axes in a common plane and comprising a front element and a rear element arranged in tandem to each other so that the torque is transmitted through said elements from the rear element to the front element, a portion of the input member comprising an engagement face having a contact zone with the rear element of said at least one pair of elements to transmit the torque load thereto, and a portion of the output member comprising an engagement face having a contact zone with the front element of said at least one pair of elements to receive the torque load transmitted therethrough, at least one of said contact zones for said pair of elements being on a radial plane of said one element that is oblique to said common plane, whereby the transmission of the torque load generates a force component transverse to said common plane to produce counter-rotary moments on the elements urging them to roll in a direction normal to said plane, resiliently displaceable means acting on said at least one pair of elements to exert a force opposing said counter-rotary moments for retaining the elements in coupling engagement with the members, said input and output members having the respective engagement faces for at least one pair of elements overlapping each other in the direction transverse to said common plane of the rolling axes of the pair of rolling elements, and said portions of the respective members being spaced from each other in the direction of said rolling axes.

3. A device according to claim 2 wherein said portions and their associated engagement faces comprise a first region of one of said input and output members extending in the direction of said rolling axes and two further regions of the other of said input and output members extending in the direction of said rolling axes and spaced on opposite sides of said first region.

4. A device according to claim 2 wherein the rolling elements consist of cylindrical rollers having their rolling axes parallel to the axis of rotation of the device and at a common radial distance therefrom, and said input and output members comprise radially inner and radially outer annular parts between which said rollers are disposed.

5. A device according to claim 4 wherein said resiliently displaceable means for said at least one pair of rolling elements comprises a bearer member mounted in said radially outer part and outwardly displaceable therein by said transverse force component, and spring biasing means for holding said bearer member against said outwards displacement.

6. A device according to claim 5 arranged as an overload release coupling, said bearer member being displaceable to a radially outer position by said counter-rotation of the rolling elements to the extent that said elements move out of driving engagement with said radially inner part, and means are provided for retaining the bearer member releasably in said outer position.

7. A device according to claim 6 further comprising resilient retaining means engaging the rolling elements for holding said elements out of coupling engagement with the members when said bearer member is in said outer position.

8. A device according to claim 2 wherein the rolling elements are arranged with their rolling axes in a plane radial to the axis of rotation of the input and output members.

9. A device according to claim 8 wherein one of said input and output members has a circular cross-section recess with an axis parallel to the axis of rotation of the member and spaced radially from said axis of rotation, and a peripheral wall of said recess provides said engagement face of the member for one of said at least one pair of rolling elements.

10. A device according to claim 9 wherein the other of said input and output members has an engagement face of corresponding radius of curvature to said one member contact zone, and said overlap between the engagement faces of the two members occupies a region spaced from the inner and outer radial limits of said recess relative to the axis of rotation of the members.

11. A device according to claim 10 wherein the rolling elements each comprise a central portion and two end portions at axially opposite regions of the rolling element axis, said end portions being sperically formed to make line contact with the engagement faces of the input and output members.

12. A device according to claim 11 wherein the central portion of each rolling element is cylindrical.

13. A device according to claim 11 wherein the central portion of each rolling element is conical and has an apex at the axis of rotation of the input and output members.

14. A device according to claim 2 arranged as a torque sensing coupling and comprising switching means actuable by the movement of said resiliently displaceable means under the influence of the rolling elements, whereby the application of a torque load beyond a predetermined limit moves said displaceable means to actuate the switching means for responding to the attainment of said limit while the rolling elements remain in coupling engagement with the input and output members.

* * * * *